Sept. 23, 1958     C. HENDERSON ET AL     2,853,571
SPEED-RESPONSIVE SWITCHING DEVICES
Filed May 28, 1956                                           4 Sheets-Sheet 1
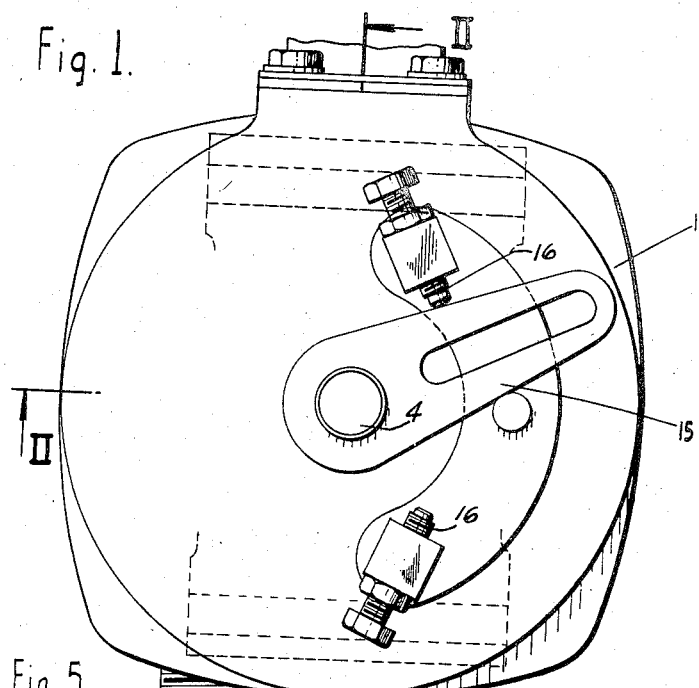
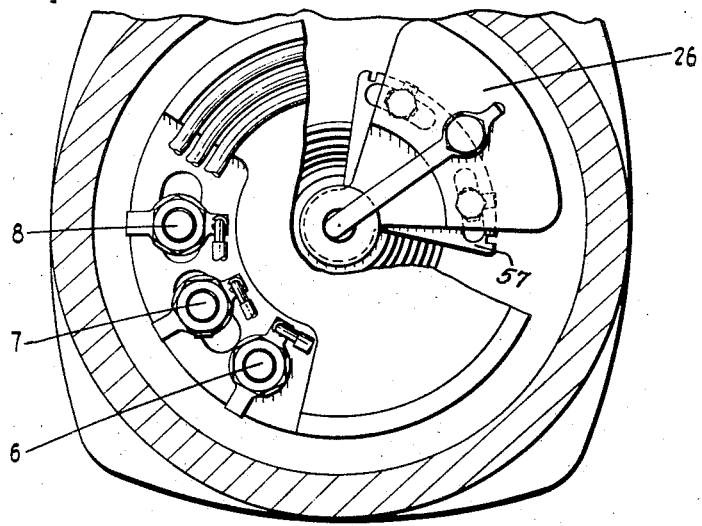
C. HENDERSON
E. J. CRHAK
Inventor
By *Moore & Hall*
Attorneys

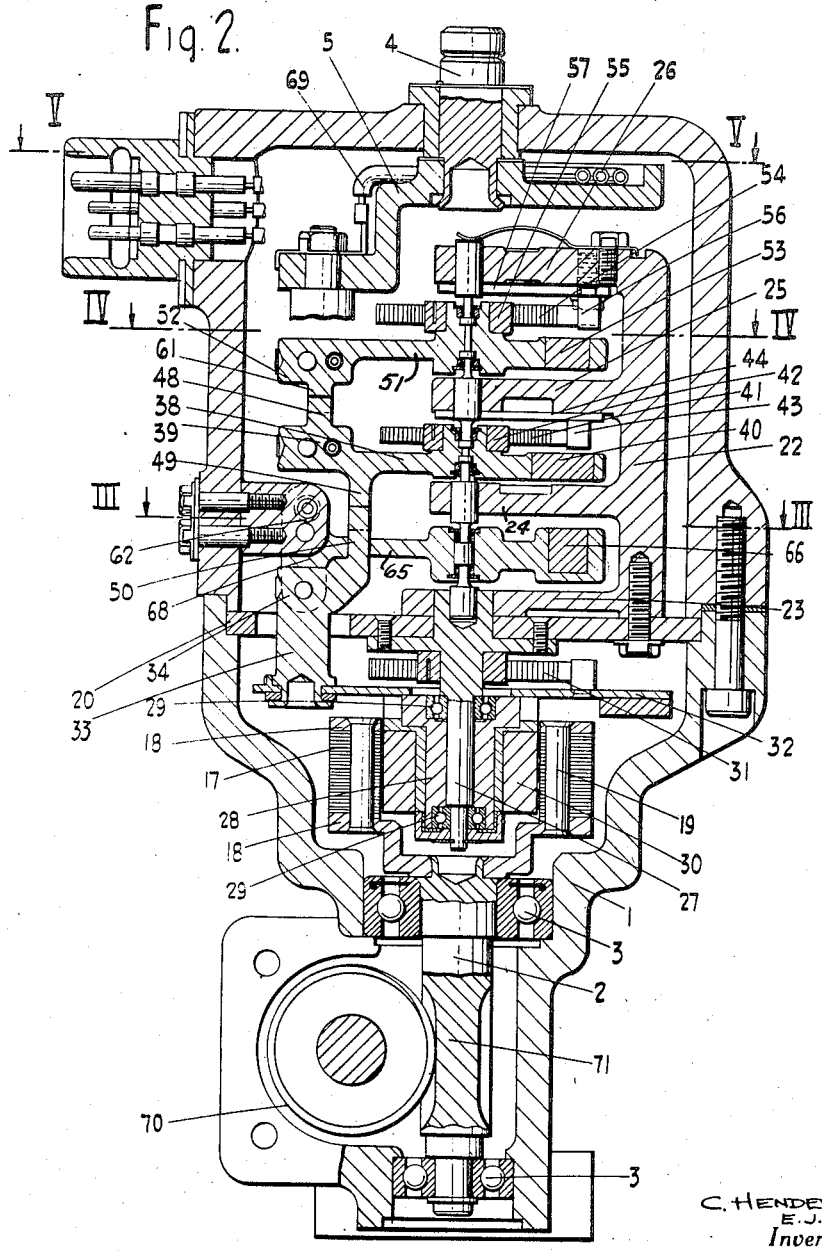

Sept. 23, 1958  C. HENDERSON ET AL  2,853,571
SPEED-RESPONSIVE SWITCHING DEVICES
Filed May 28, 1956  4 Sheets-Sheet 3

C. HENDERSON
E. J. CRHAK
Inventor

By Moore & Hall
Attorney

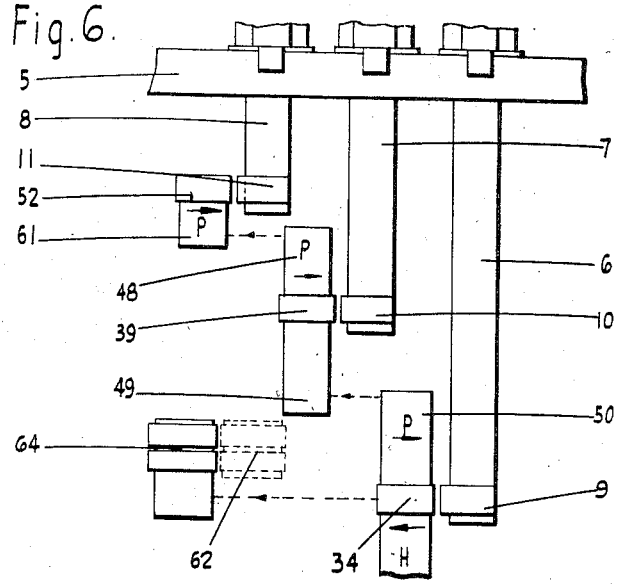
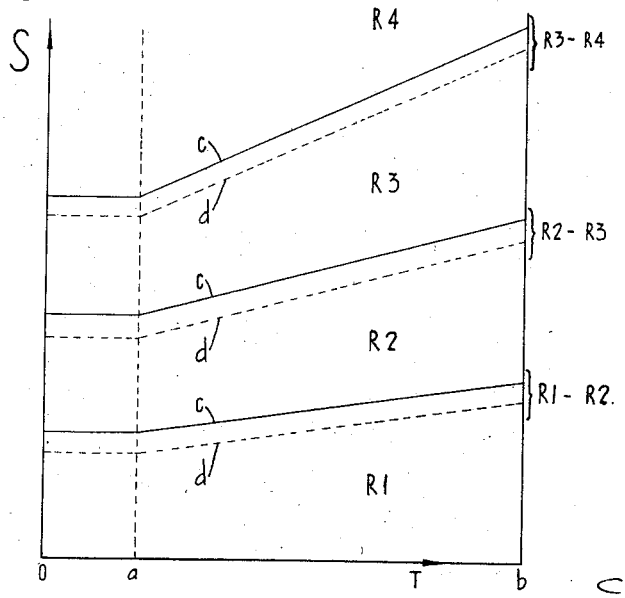

United States Patent Office 2,853,571
Patented Sept. 23, 1958

2,853,571

SPEED-RESPONSIVE SWITCHING DEVICES

Cyril Henderson, New Malden, and Emerich Joseph Crhak, Stanmore, England; said Henderson assignor to Smiths America Corporation, Washington, D. C.

Application May 28, 1956, Serial No. 587,752

13 Claims. (Cl. 200—61.46)

The present invention relates to speed-responsive electrical switching devices. It is sometimes necessary to provide a device responsive to the rate of rotation of a shaft to actuate an electric circuit (either by opening it or closing it) at a speed which is dependent upon some variable quantity. For example in a transmission control system for a motor vehicle it may be desired to control electrically changes of gear ratio in accordance with both vehicle speed and throttle position, changes being effected at higher speeds with the throttle fully open than with it partially closed.

It is accordingly an object of the present invention to provide an electric switching device responsive to the rate of rotation of the shaft and adapted to actuate an electric circuit at a speed dependent upon a variable quantity.

According to the present invention we provide, in an electric switching device, responsive to the rate of rotation of a shaft, co-operating magnetized and eddy current members, one attached to the shaft and the other resiliently restrained against rotation about the shaft axis, a contact actuating means positioned by the resiliently restrained member, an abutment positioned in an adjustable location about the axis of the shaft, the actuating means and abutment being adapted to engage (or disengage) at a rate of rotation dependent upon said location, and contacts actuated upon engagement (or disengagement) between them.

An embodiment of the invention, suitable for the control of an automatic transmission for a conventional motor vehicle, will now be described with reference to the accompanying drawings of which:

Figure 1 is a view of the housing from the top.

Figure 2 is a vertical cross section of the whole mechanism along the line II—II in Figure 1.

Figure 5 is a horizontal cross section along the line V—V in Figure 2.

Figure 6 is a developed side view of part of the mechanism, showing the contact posts and the eight contact units. The arrow marked "H" indicates the electromagnetic torque, the arrows marked "P" indicate the combined restraints of the hairsprings and the permanent magnets.

Figure 7 is a graph illustrating the variation in the speed at which the various changes in ratio take place, with respect to the throttle setting.

Figure 3:
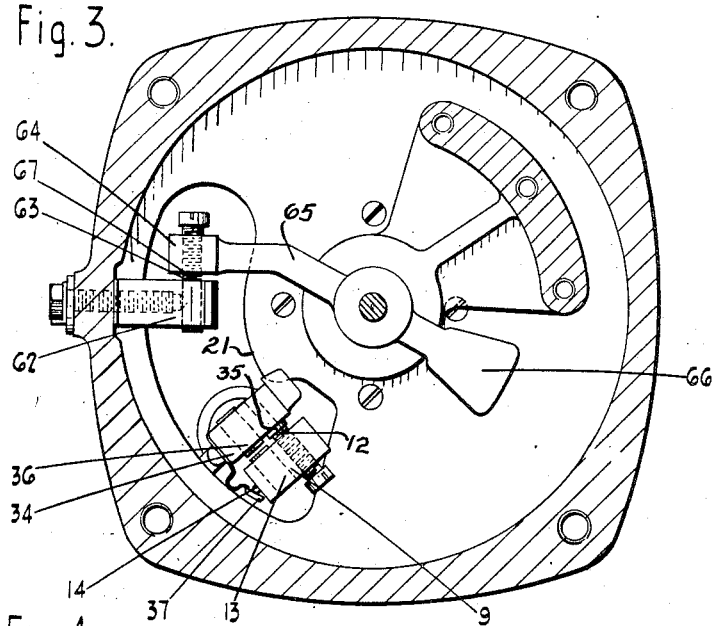
Figure 3 is a horizontal cross section along the line III—III in Figure 2.
Figure 4:
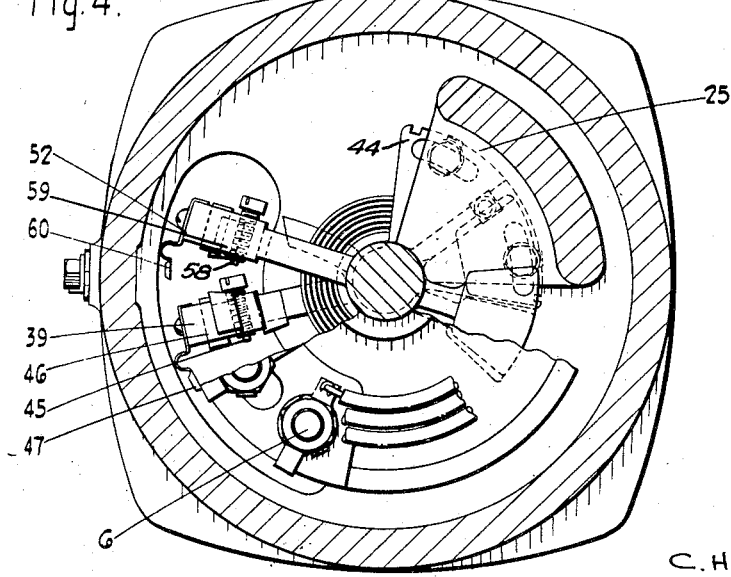
Figure 4 is a horizontal cross section along the line IV—IV in Figure 2.

Throughout the description "clockwise" and "anticlockwise" refer to the direction of rotation of moving parts when viewed from above.

The device comprises an outer housing 1 in two sections which are normally bolted together. An input shaft 2 is journalled in a pair of ball bearings 3 carried at the end of the housing, and a stub shaft 4 coaxial with shaft 2 is mounted at the other end of the housing. A moulding 5 of insulating material is secured to the end of stub shaft 4 inside the housing and carries, near its periphery, three contact posts, all parallel to and equidistant from the input shaft axis. The first post 6, comprising an abutment, is the longest; the second post 7 is displaced from the first post by a small angle in a clockwwise direction; the third and shortest post 8 is displaced from the second by a further small angle in a clockwise direction.

The first, second, and third posts carry at their lower ends identical contact units 9, 10, 11 respectivley, having contacts 12 facing in a clockwise direction, small permanent magnets 13 adjacent to them, and, on the outside, subsidiary contacts 14.

Stub shaft 4 may be positioned by an arm 15 whose movement is limited by stops 16.

A hollow cylindrical rotor 17, constructed of a stack of annular soft iron stampings held in position between two annular end-plates 18 by a number of copper bars 19 riveted over at their ends, is attached to the end of shaft 2 lying inside housing 1. The stack and bars form an assemblage similar to the rotor of a squirrel cage motor. Rotor 17 constitutes the eddy-current member referred to earlier. A plate 20 is clamped between the two sections of housing 1, being provided with an arcuate slot 21. Plate 20 has attached to it, on the side remote from rotor 17, a supporting pillar 22 having four projecting sectors 23, 24, 25, 26, at right angles to the axis of shaft 2, and arranged to support between them members for rotation about this axis. Sector 23 is in contact with plate 20.

An arbor 27 is secured to plate 20 and projects into rotor 17, being coaxial with shaft 2. A sleeve 28 is rotatably mounted upon arbor 27 by means of ball bearings 29. Sleeve 28 carries a permanently-magnetised cylindrical part 30 with diametrically opposed poles, there being a small annular air gap between part 30 and the interior of rotor 17. A mainspring 31 is anchored to arbor 27 and to a disc 32. Disc 32 is symmetrically attached to sleeve 28 and carries near its circumference a column 33 which projects through a slot 21 in plate 20 and overlaps, to some extent, the longest contact abutment post 6.

A contact unit 34 is carried by this column, having a contact 35 facing in an anti-clockwise direction, a permanent magnet 36, and a subsidiary contact 37 in the form of a flexible strip. It is arranged that when contact 12 on the first post makes connection with contact 35 on the column, the appropriate poles of the permanent magnets 13, 36 are adjacent, and the subsidiary contacts are touching. The permanent magnets are orientated so that they attract one another.

A first lever 38 is pivoted in jewelled bearings between sectors 24, 25, and carries at one end a contact unit 39, and at the other end a balancing weight 40. A hair spring is anchored to boss 42 on lever 38 and to stud 43 supported by an adjustable plate 44 attached to sector 25 of pillar 22. Contact unit 39 has a contact 45 facing in an anti-clockwise direction, a permanent magnet 46, and a subsidiary strip contact 47. This contact unit co-operates with contact unit 10 on the second post. Arms 48, 49 project upwards and downwards respectively from contact unit 39, and arm 49 is positioned so that a similar arm 50, which projects upwards from contact member 34, bears against it when disc 32 is rotated in a clockwise direction.

A second lever 51 is pivoted in jewelled bearings between sectors 25, 26, and carries at one end a contact unit 52, and at the other end a balancing weight 53. A hair spring 54 is anchored to boss 55 of lever 51 and to a stud 56 supported by an adjustable plate 57 attached to sector 26 of pillar 22. Contact unit 52 has a conact 58 facing in an anti-clockwise direction, a permanent magnet 59, and a subsidiary strip contact 60. This contact unit co-operates with contact unit 11 on the third post. An arm 61 projects downwards from contact unit 52 and is positioned so that arm 48 bears against it when lever 38 is rotated through a small angle in a clockwise direction.

The device includes two further contact units. One indicated at 62, is attached to the housing approximately in line with sector 24 and includes a contact 63 facing clockwise with a permanent magnet beneath it. The other indicated at 64, is attached to one end of a third lever 65 with a balancing weight 66 pivoted between sectors 23, 24, and co-operates with unit 62, having a contact 67 facing in an anti-clockwise direction and a permanent magnet orientated to attract the magnet of unit 62. There are no subsidiary contacts in this case and lever 65 is not restrained by a hairspring. The clockwise-facing pole of permanent magnet 36 in contact unit 34 bears against an arm 68, which projects downwards from contact unit 64, when disc 32 has turned in a clockwise direction through an angle dependent on the position of stub shaft 4.

The three contact units 9, 10, 11, are connected to an external electric circuit through the conducting contact posts 6, 7, 8, and then through three flexible wires 69. Contacts 35, 45, 58 are earthed to housing 1 through hairsprings 31, 41, 54 respectively, and contact 67 is earthed through the pivots of lever 65.

When input shaft 2 is rotated continuously in a clockwise direction eddy currents are induced in copper bars 19, and a torque, dependent upon the speed of rotation, and in a clockwise sense, acts upon cylindrical part 30, tending to move sleeve 28 and contact unit 34 against the combined restraints of hairspring 31 and permanent magnets 13, 36 (which initially hold unit 34 in contact with unit 9). When the speed of rotation reaches a first value, dependent upon the rotational position of stub shaft 4, the connection between contacts 12, 35 is broken. Disc 32 then rotates until arm 50 bears against arm 49 of contact unit 39. The speed having reached a second value, dependent on the position of stub shaft 4, such that the torque is greater than the attraction between the magnets of units 10, 39 and the restraint of hairsprings 31, 41, the connection between contact units 10, 39 is broken. Contact units 10, 39, then move together until arm 48 bears against arm 61 of contact unit 52. When the speed reaches a third value, dependent upon the position of stub shaft 4, such that the torque is greater than the attraction between the permanent magnets of units 39, 52 and the combined restraint of springs 31, 41, 54 the connection between units 39, 52 is broken. At higher speeds of rotation the three moving contact units take up a position where the combined restoring force of the three hairsprings equals the electromagnetic torque. On reaching a fixed point, contact unit 34 bears against arm 68 of contact unit 64 and breaks the connection between contacts 63, 67. Permanent magnet 36 then carries contact unit 64 (arm 68 being of ferrous material) until disc 32 moves back sufficiently for contacts 63, 67, to be reengaged.

A gradual reduction to zero of the speed of rotation causes the sequence to be reversed; the contacts of units 11, 52 close first, then the contacts of units 10, 39, and finally the contacts of units 9, 34. The speed of rotation at which a given pair of contacts open is greater than that at which they close, provided the magnets and hairsprings are suitably chosen. The combined restraining force of the magnets and hairspring acting on a particular unit falls as the contacts part, reaches a minimum at a certain distance of separation and then rises as the distance apart increases further. The electromagnetic torque at which the contacts suddenly close is the minimum value, whilst the torque required for them to open is the high initial value.

When the speed of rotation falls from a high value, the three contact units move back together until unit 52 is held by the third contact post and their contacts close; the two remaining units then move back further until contact unit 39 is held by the second post and their contacts close; unit 34 then moves back alone until it reaches the first post, and contacts 12, 35 close. The speed of rotation of the input shaft at which each pair of contacts close is lower than that at which they open. When a contact unit moves away from a contact post, although the acceleration is relatively high, the initial speed, when electrical contact is broken, is low, and the contacts may be damaged by sparking. This difficulty is overcome by providing subsidiary contacts (already mentioned) which open after the main contacts so that sparking can only take place between the subsidiary contacts. Furthermore, since the subsidiary contacts part at an appreciably higher relative speed than the main contacts, the tendency for sparking is lessened.

The sequence of changes which has been described is not altered when the rotational position of stub shaft 4 is varied. However, as it is advanced in a clockwise direction the speeds at which make and break of contacts 12, 35 take place are equally increased; similarly the speeds at which make and break of the contacts of units 10, 39 take place are equally increased, but to a greater extent (on account of the additional spring 41), and the corresponding speeds for the contacts of units 11, 52, are equally increased to a still greater extent (on account of the two additional springs 41, 54).

The device shown and described is particularly suitable for the control of an automatic transmission for a conventional motor vehicle. Shaft 2 is then driven from the tail shaft of the gear box through gear 70 and pinion 71, and thus rotates in accordance with vehicle speed. Arm 15 is displaced by means of a suitable linkage in accordance with throttle opening, increasing throttle opening corresponding to clockwise rotation of arm 15. The transmission is such that when all the units are in contact, the lowest gear ratio is engaged, when units 10, 39, and 11, 52 only are in contact the second gear ratio is engaged, when units 11, 52 only are in contact, the third gear ratio is engaged, and when none of the units are in contact the highest gear ratio is engaged. Thus the speeds at which changes of ratio occur are increased with increasing throttle opening, as is required, the greatest increase being for the change into the highest ratio with the others in proportion. Referring to Figure 7, road speed is represented by S and throttle opening by T. Full throttle is indicated at $b$. Lines $c$ plot changes of ratio when the speed is increasing, and lines $d$ when the speed is decreasing. R1, R2, R3, R4, refer to the first, second, third and fourth gear ratios respectively.

The pair of units 62, 64 is incorporated in the electrical circuit of the automatic transmission so that it is impossible for the ratio to change from fourth to third when the road speed is so high that the engine would be damaged.

It may also be desirable for gear changes below a small throttle opening to be made solely in accordance with speed and independently of throttle position (O—$a$ in Figure 7). In such a case a suitable lost motion device may be interposed between the throttle and arm 15.

A tendency to frequent and undesirable changes of ratio when speed and throttle setting remain at the approximate values for which a particular change can take place is prevented by the permanent magnets in the contact units. These cause an upward change of ratio to take place at a higher speed than the corresponding downward change, for a given throttle setting (as has been explained).

We claim:

1. An electric switching device responsive to the rate of rotation of a shaft having cooperating magnetized and eddy current members, one attached to the shaft and the other resiliently restrained against rotation about the shaft axis, a contact actuating means positioned by the resiliently restrained member, an abutment means positioned in an adjustable location about the axis of the shaft, the actuating means and the abutment means being adapted to cooperate operatively at a rate of rotation dependent upon said location, and contacts actuated upon said operative cooperation between them.

2. An electric switching device as claimed in claim 1 having mutually attractive magnetic means to ensure actuation of the contacts at different speeds according as the rate of rotation is increasing or decreasing.

3. An electric switching device as claimed in claim 2 wherein the magnetic means comprise cooperating parts on the actuating means and the abutment.

4. An electric switching device as claimed in claim 1 wherein the contacts comprise cooperating parts carried on the actuating means and the abutment.

5. An electric switching device as claimed in claim 3 wherein the contacts comprise cooperating parts carried on the actuating means and the abutment.

6. An electric switching device responsive to the rate of rotation of a shaft having cooperating magnetized and eddy current members, one attached to the shaft and the other resiliently restrained against rotation about the shaft axis, a contact actuating means positioned by the resiliently restrained member, an abutment positioned in an adjustable location about the axis of the shaft, the actuating means and the abutment being adapted to engage (or disengage) at a rate of rotation dependent upon said location, and contacts actuated upon engagement (or disengagement) between them, an additional abutment or abutments positioned in an adjustable location or locations about the axis of the shaft and associated additional contact actuating means, and additional contacts, the additional contact actuating means being engaged, directly or indirectly, in succession by the actuating means upon increase in the rate of rotation of the shaft.

7. An electric switching device as claimed in claim 6, having mutually attractive magnetic means to ensure actuation of the contacts at different speeds according as the rate of rotation is increasing or decreasing, wherein the magnetic means comprise cooperating parts on the abutments and the actuating means.

8. An electric switching device as claimed in claim 7, wherein the contacts comprise cooperating parts carried on the actuating means and the abutments.

9. An electric switching device as claimed in claim 7, wherein the contacts comprise cooperating parts carried on the actuating means and the abutments.

10. An electric switching device as claimed in claim 6, wherein the abutment and the additional abutment or abutments are rigidly connected together for simultaneous adjustment by equal amounts about the axis of the shaft.

11. An electric switching device as claimed in claim 9, wherein the abutment and the additional abutment or abutments are rigidly connected together for simultaneous adjustment by equal amounts about the axis of the shaft.

12. An electric switching device as claimed in claim 6, comprising a further, fixed abutment, a further contact actuating means, and further contacts associated therewith, the further contact actuating means being engaged directly or indirectly by the actuating means upon increase in the rate of rotation of the shaft to actuate the further contacts subsequent to the actuation of the contacts associated with the adjustable abutments.

13. An electric switching device as claimed in claim 11 comprising a further, fixed abutment, a further contact actuating means, and further contacts associated therewith, the further contact actuating means being engaged directly or indirectly by the actuating means upon increase in the rate of rotation of the shaft to actuate the further contacts subsequent to the actuation of the contacts associated with the adjustable abutments.

References Cited in the file of this patent
UNITED STATES PATENTS

| | | |
|---|---|---|
| 2,631,025 | Bone | Mar. 10, 1953 |
| 2,643,871 | Warrick | June 30, 1953 |
| 2,701,035 | Leichsenring | Feb. 1, 1955 |